US008094587B2

(12) United States Patent
Halbraich et al.

(10) Patent No.: US 8,094,587 B2
(45) Date of Patent: *Jan. 10, 2012

(54) METHOD FOR FORWARDING AND STORING SESSION PACKETS ACCORDING TO PRESET AND/OR DYNAMIC RULES

(75) Inventors: Eran Halbraich, Bet Zayit (IL); Eytan Bar, Even Yehuda (IL)

(73) Assignee: Nice Systems Ltd., Raanana (IL)

( * ) Notice: Subject to any disclaimer, the term of this patent is extended or adjusted under 35 U.S.C. 154(b) by 218 days.

This patent is subject to a terminal disclaimer.

(21) Appl. No.: 12/331,595

(22) Filed: Dec. 10, 2008

(65) Prior Publication Data

US 2009/0116476 A1    May 7, 2009

Related U.S. Application Data

(63) Continuation of application No. 10/913,326, filed on Aug. 9, 2004, now Pat. No. 7,474,633, which is a continuation of application No. PCT/IL03/00109, filed on Feb. 12, 2003.

(60) Provisional application No. 60/387,925, filed on Jun. 13, 2002.

(30) Foreign Application Priority Data

Nov. 12, 2002    (GB) .................................. 0226384.6

(51) Int. Cl.
*H04L 12/16* (2006.01)
(52) U.S. Cl. .......... 370/260; 370/352; 709/206; 379/70; 379/85; 379/87
(58) Field of Classification Search .................. 370/260, 370/261, 270, 271, 352, 390, 392, 401, 432; 709/205–207, 224, 243; 379/70–87
See application file for complete search history.

(56) References Cited

U.S. PATENT DOCUMENTS 5,099,510 A     3/1992 Blinken et al.
(Continued)

FOREIGN PATENT DOCUMENTS

EP            0 841 832           5/1998
(Continued)

OTHER PUBLICATIONS

Jiang, "Towards Junking the PBX: Deploying IP Telephony", International Workshop on Network and Operating System Support for Digital Audio and Video archive, Proceeding of the 11$^{th}$ international workshop on Network and operating systems support for digital audio and video, Port Jefferson, New York, United States, pp. 177-185.

(Continued)

*Primary Examiner* — Jeffrey M Rutkowski
(74) *Attorney, Agent, or Firm* — Pearl Cohen Zedek Latzer, LLP (57) ABSTRACT

A system and method for recording and/or monitoring data by forwarding it, with or without analyzing or otherwise filtering the data itself are provided. According to embodiments of the invention, the system and method are operative over IP networks. According to an embodiment of the invention, there is provided a system and method for forwarding data according to at least one characteristic of the data, such as the session's metadata for example, without analyzing or otherwise filtering the data itself. According to another embodiment of the invention, before the data is forwarded to the recording device, pre-processing algorithms are performed according to a system preset or according to one or more rules.

22 Claims, 8 Drawing Sheets

U.S. PATENT DOCUMENTS

| | | | |
|---|---|---|---|
| 5,101,402 A | 3/1992 | Chiu et al. | |
| 5,515,376 A | 5/1996 | Murthy et al. | |
| 5,559,875 A | 9/1996 | Bieselin et al. | |
| 5,710,591 A | 1/1998 | Bruno et al. | |
| 5,764,901 A | 6/1998 | Skarbo et al. | |
| 5,787,253 A | 7/1998 | McCreery et al. | |
| 5,841,977 A | 11/1998 | Ishizaki et al. | |
| 5,867,559 A | 2/1999 | Jorgensen et al. | |
| 5,893,053 A | 4/1999 | Trueblood | |
| 5,946,375 A * | 8/1999 | Pattison et al. | 379/85 |
| 5,963,913 A | 10/1999 | Henneuse et al. | |
| 5,978,835 A | 11/1999 | Ludwig et al. | |
| 6,006,253 A | 12/1999 | Kumar et al. | |
| 6,021,428 A * | 2/2000 | Miloslavsky | 709/206 |
| 6,108,782 A | 8/2000 | Fletcher et al. | |
| 6,122,665 A | 9/2000 | Bar et al. | |
| 6,181,784 B1 | 1/2001 | Duran et al. | |
| 6,311,231 B1 | 10/2001 | Bateman et al. | |
| 6,480,584 B2 | 11/2002 | Duran et al. | |
| 6,490,344 B1 | 12/2002 | Murai et al. | |
| 6,504,907 B1 | 1/2003 | Farris et al. | |
| 6,535,909 B1 | 3/2003 | Rust | |
| 6,542,602 B1 | 4/2003 | Elazar | |
| 6,549,516 B1 * | 4/2003 | Albert et al. | 370/432 |
| 6,553,025 B1 * | 4/2003 | Kung et al. | 370/352 |
| 6,574,335 B1 | 6/2003 | Kalmanek, Jr. et al. | |
| 6,636,587 B1 * | 10/2003 | Nagai et al. | 379/87 |
| 6,647,020 B1 | 11/2003 | Maher et al. | |
| 6,661,879 B1 | 12/2003 | Schwarts et al. | |
| 6,839,323 B1 * | 1/2005 | Foti | 370/392 |
| 6,876,633 B2 | 4/2005 | Strathmeyer et al. | |
| 6,985,440 B1 | 1/2006 | Albert et al. | |
| 7,010,106 B2 | 3/2006 | Gritzer et al. | |
| 7,055,174 B1 * | 5/2006 | Cope et al. | 379/85 |
| 7,305,082 B2 | 12/2007 | Elazar et al. | |
| 7,376,570 B2 * | 5/2008 | Sone | 370/352 |
| 7,474,633 B2 * | 1/2009 | Halbraich et al. | 370/352 |
| 2001/0052081 A1 | 12/2001 | McKibben et al. | |
| 2002/0006187 A1 | 1/2002 | Lukas | |
| 2002/0027977 A1 * | 3/2002 | Noguchi | 379/67.1 |
| 2002/0116464 A1 * | 8/2002 | Mak | 709/206 |
| 2003/0107991 A1 | 6/2003 | Tezuka et al. | |
| 2003/0142805 A1 | 7/2003 | Gritzer et al. | |
| 2003/0200311 A1 * | 10/2003 | Baum | 709/224 |
| 2003/0219025 A1 | 11/2003 | Choi et al. | |
| 2004/0165709 A1 | 8/2004 | Pence et al. | |
| 2004/0218583 A1 | 11/2004 | Adan et al. | |
| 2004/0228627 A1 | 11/2004 | Alana et al. | |
| 2005/0094651 A1 | 5/2005 | Lutz et al. | |
| 2005/0141691 A1 | 6/2005 | Wengrovitz | |
| 2005/0175156 A1 | 8/2005 | Afshar et al. | |
| 2005/0240656 A1 | 10/2005 | Blair | |
| 2006/0107310 A1 | 5/2006 | Schmid et al. | |

FOREIGN PATENT DOCUMENTS

| | | | |
|---|---|---|---|
| EP | 0902569 | | 3/1999 |
| EP | 1512263 | | 9/2003 |
| WO | WO 99-46702 | | 9/1999 |
| WO | WO 01/60027 | * | 8/2001 |
| WO | WO 02/19620 A2 | | 3/2002 |

OTHER PUBLICATIONS

U.S. Appl. No. 11/503,117, filed Aug. 14, 2006, Fisher et al.

Office Action from U.S. Appl. No. 11/452,917 date of mailing Mar. 29, 2010.

"Check Point Fire Wall-1: Extensible Stateful Inspection" Check Point Software Technologies, www.checkpoint.com/products/technology/page3.html, 3 P., 1998.

"Vic-Video Conference" http://www.archive.org/web/19980209092521/mash.cs.berkeley.edu/mash..., 1998.

Beckman "Netmeter 1.0: See and Hear Your Network" Mac Publishing, L.L.C., p. 72, 1996.

McCanne et al. Vat-LBNL Audio Conferencing Tool http://www.archive.org/web/19980126183021/www-nrg.ee.lbl.gov/vat/, 5 p. 1998.

"Player (Player): Syntax", http://www.archive.org/web/19980209092521/mash/cs.berkely.edu/mash..., 3 P., 1998.

Raman Suchitra & Angela Schuett "On-demand Remote Playback" Department of ECCS, University of California Berkeley C5294-7 "CSCW using CSCW" course Project Report, Dec. 1997 Dec. 2007.

Intel Corporation "Intel Internet Video Phone Trail Applet 2.1: The Problem and Pitfalls of Getting H.323 Safety Through Firewalls" http://support.intel.com/support/videophone/trail21/h323_wpr.htm#a18, 32 P. 1997.

Pelletier et al. "Netmeeting Through a Packet-Filter", Topic in comp. security.firewalls, 4 P., 1998.

Eldrige et al. "MS NetMeeting 2.0 and Raptor Eagle Vers. 4.0" Topic in muc.lists.firewalls, 3 P., 1997.

"Communications Solutions: Vendor to Vendor" CTI News, http://www.tncnet.com/articles/ctimage/0699/0699news.htm, 15 P., 1999.

"Breakthrough Internetworking Application for Latency & Loss Measurement From RADCOM" http://www.radcom.com/radcom/about/pr020999.htm, 2 P., 1997.

"New VoIP Testing Application From RADCOM" http://www.radcom.com/radcom/about/pr020999.htm, RADCOM Press Releases, 2 P., 1999.

"Protocols, Protocols, Protocols . . . ", http://www.radcom-inc.com/protpcol.htm, Supported Protocols RADCOM, 10 P., 1998.

"RADCOM Adds UNI 4.0 Signalling and MPEG-II Support to ATM Analysis Solutions", http://www.radcom-inc.com/press13.htm, 1 P., 1996.

Willis "Voice Over I, The Way It Should Be" WAN System & Telephony, http://www.nwc.com/1001/1001ws12.html, 5 P., 1999.

"Hear It for Yourself: Audio Samples From Our H.323 Tests" WAN System & Telephony, http://www.nwc.com/1001/1001ws12.html, 7 P. 1999.

"Prism200 Multiport WAN/LAN/ATM Analyzer" RADCOM, http://www.radcom-inc.com/pro-pl.htm, 3 P., 1998.

AG Group "EtherPeek for Windows. Version 2.0 User's Guide" Eternet Network Analysis Software, User Manual, AG Group, Inc., 169 P., 1989-1997.

Kohlhepp "AG Group Skyline/Satelite Combination Offers Bird's-Eye View of Network Traffic", http://ibg.networkcomputing.com/612/612skyline.html, 7 P., 1995.

"Microsoft RIFF", http://netghost.narod.ru/gff/graphics/summary/micriff.htm, 5 P., 1996.

"Supported Applications" Check point Software Technologied Ltd., http://www.checkpoint.com/products/technology/index.html, 6 P. 1998.

AG Group "About Skyline/Satellite", http://www.aggroup.com/skyline/, Feb. 1998.

Waldbusser "RFC 1757—Remote Network Monitoring Management Information Base", http://www.faqs.org/rfcs/rfc1757.html, 65 P., 1995.

"PrismLite: Portable WAN/LAN/ATM Protocol Analyzer", http://www.radcom-inc.com/pro-p2.htm, 3 P., 1998.

Simpson "Viewing RTPDump Files", http://bmrc.berkeley.edu/-davesimp/veiwingNotes.html, 1 P., 1996.

Koyama et al. "Personal Multimedia Communication System", Hitachi Rev., 44(4): 207-212, 1995. p. 211, r-h Col., 2—p. 212, 1-h Col.., 1 Fig 6; Claims: A: 2.

Schulzrinne et al. "RFC 1889: RTP: A Transport Protocol for Real-Time Applications" Network Working Group Request for Comments, p. 1-38, 1996. 02.1-02.3, 05.2, 05.3, Claims: A:127.

Office Action date of mailing Nov. 17, 2009 from U.S. Appl. No. 11/452,917.

Final Office Action issued for U.S. Appl. No. 11/452,917 and dated Jul. 8, 2011.

* cited by examiner

METHOD FOR FORWARDING AND STORING SESSION PACKETS ACCORDING TO PRESET AND/OR DYNAMIC RULES

CROSS-REFERENCE TO RELATED APPLICATIONS

This application is a continuation of U.S. patent application Ser. No. 10/913,326 U.S. Pat. No. 7,474,633, Aug. 9, 2004, which is a continuation of PCT/IL03/00109 filed on Feb. 12, 2003, which claims priority from United Kingdom Patent Application No. 0226384.6 filed on Nov. 12, 2002, which claims priority from U.S. Provisional Application No. 60/387,925, filed on Jun. 13, 2002. All of these are hereby incorporated by reference as if fully set forth herein.

FIELD OF THE INVENTION

The present invention relates to a system and a method for recording voice and other data passed through IP sessions and/or other data or media sessions, and in particular, for such a system and method in which a recording session is triggered. The present invention also relates to a system and method for selectively recording and monitoring voice and other data passed through a session, which may optionally be an IP session and/or a multimedia session or any other type of media or data session, by forwarding the data without a need for filtering the data itself by the recording and monitoring system. Such forwarding may be triggered according to metadata and/or other external characteristics of the data itself.

BACKGROUND OF THE INVENTION

Telecommunication is an important aspect of interactions between individuals, as it enables individuals to communicate without being physically present in the same location, thereby potentially increasing the possibilities for cooperation between such individuals. Simultaneously, an increasing number of telecommunication sessions are being monitored and/or recorded, for example for quality assurance at a "help desk" or other customer support center or service center, and/or on a financial trading floor.

Previously, such monitoring or recording was relatively simple in the background art. For example, telephone calls may typically be passed to the individual through a PBX (public exchange) switch or CO (central office), which features a central switching matrix. All telephone calls passing this switch would therefore pass through the central matrix, such that integration of the recording and/or monitoring equipment with the central matrix would enable all such telephone calls to be recorded and/or monitored.

Unfortunately, monitoring and/or recording such telephone calls through the IP session protocols is not as simple. For example, the session does not pass through a central switching matrix, as IP communication does not feature such a matrix. Thus, such communication is relatively diffuse, even across a WAN (wide area network) or LAN (local area network).

The situation is further complicated by the topology of the IP network, which consists of switch boxes, routers and bridges, and which may prevent any recording and/or monitoring system from accessing such communication sessions that are routed on different network segments. In addition, encrypted sessions add a further element of complexity, as access to such sessions is typically only granted to participants, as only participants have access to the necessary information to decrypt the encrypted session.

Furthermore, currently available systems may easily overwhelm the network and/or the recording or monitoring device with the large volumes of data that can be generated through such monitoring. This problem may be particularly acute with media/sessions, which typically feature the transmission of a plurality of different types of data. One attempted solution to this problem is to filter data before it is recorded and/or otherwise stored. In order to filter the packets of interest for determining which packets should be stored, processing and memory resources must be expended. Additionally, the process of filtering further limits the capacity of the processing unit to a limited and relatively small number of concurrent sessions.

Furthermore, simply adding more filtering units (each of which is required to filter another portion of the required sessions) might not solve the problem, as all of the units that monitor the same network infrastructure also must operate on the same amount of pre-filtered data.

SUMMARY OF THE INVENTION

The background art does not teach or suggest a solution to the problem of collecting information about an interactive session over an IP network. The background art also does not teach or suggest a solution to the problem of monitoring and/or recording IP media sessions, particularly with regard to the potentially large amounts of data that may be collected. The background art does not teach or suggest a system or method for selectively forwarding data, according to dynamic and/or static rules, without a need for analyzing or filtering the data itself by the recording/monitoring system in order to verify whether it should be recorded or monitored. Furthermore, the background art does not suggest an implementation in which data sent within the session to the recording/monitoring system is compressed, even and especially when the data sent between the other parties of the monitored/recorded session is not compressed.

The present invention overcomes these problems of the background art by providing a system and method for recording and/or otherwise monitoring IP media/sessions. Hereinafter, the term "media" also includes "multimedia", as for example IP sessions may also optionally be multimedia sessions, with data being exchanged according to one or more different types of media. It should also be noted that the present invention is also useful for any type of IP session, as well any type of media or multimedia session, or any type of data session. A preferred embodiment of the present invention is related to "voice over IP" sessions, or voice communication through IP sessions, for example for a conference call.

The present invention features a recording and/or monitoring device, referred to hereinafter as "a recording device" for the purposes of clarity only and without any intention of being limiting. The recording device is preferably a participant in the IP media session, although more preferably the recording device only receives data for recording and/or otherwise monitoring the session. Therefore, the IP media session is preferably a multi-user session, such as a "conference call" for example, even if data is being provided for recording from only one of the participants in the session. This implementation of the present invention, as described in greater detail below, overcomes such drawbacks of the background art as the inability to otherwise decrypt encrypted sessions, and recording across network segments.

Alternatively, the recording device may receive the data to be recorded and/or monitored through a separate recording session or any other separate type of communication, such that the recording device is optionally not a participant in the IP session.

According to one embodiment of the present invention, the data that is transmitted to the recording device comprises compressed data that can optionally be either decompressed by the recording/monitoring device, or alternatively stored as received.

According to a preferred embodiment of the present invention, there is provided a system and method for forwarding data according to at least one characteristic of the data without analyzing or otherwise filtering the data itself Such characteristics may optionally be included in the metadata related to the session, e.g.—the identifier(s) for the parties in the session, the media type or types of data being exchanged or transferred in the session, the subject of the session, some type of indication that the session belongs to a group of similar sessions etc. The present invention features a recording and/or monitoring device, referred to hereinafter as "a monitoring device" for the purposes of clarity only and without any intention of being limiting. The monitoring device is a participant in the IP medial session, although preferably the monitoring device only receives data for recording and/or otherwise monitoring the session, and/or for forwarding the data to another such device that performs the recording and/or monitoring of the session. Therefore, the IP media session is preferably a multi-user session, such as a "conference call" for example, even if data is being provided for recording from only one of the participants in the session. This implementation of the present invention, as described in greater detail below, overcomes such drawbacks of the background art as the inability to otherwise decrypt encrypted sessions, and recording across network segments.

Hereinafter, the term "separate network portion" includes any separate portion or network across which recording is performed, such as a different network segment and/or network for example.

According to a preferred embodiment of the present invention, the monitoring device is present on a network with a conference control unit, such as a MCU (multi conference unit) for example. Hereinafter, the term "conference" is used to refer to any multi-participant session, even if only two participants are present, one of which is the device of the present invention. The conference control unit either receives a request to initiate the conference call (media or multimedia session) from the recording device of the present invention and/or from one of the participating IP communication devices, and/or from some other component on the network. Examples of such communication devices include, but are not limited to, IP telephony devices, IP telephones and computational devices which include an IP telephony component.

According to another preferred embodiment of the present invention, at least one, but optionally and more preferably all of the entities or parties which participate in the recorded/monitored session are able to duplicate the received and sent data, and then to forward the data to the recording/monitoring system. Optionally and preferably, the data is forwarded after only minimal address information is provided and/or changed, such that for example preferably only the destination IP address and port are changed, for example for data that is transmitted as IP packets. Thus, the data is preferably forwarded with minimum pre-processing.

According to another preferred embodiment of the present invention, the duplication and forwarding of the recorded/monitored session data is performed by another component of the IP communication system, other than by a party to the session, for example by a gateway.

It should be noted that the data to be forwarded may optionally be summed (all or some parts of the session) before forwarding, but may alternatively be unsummed. In the latter case it may optionally be summed by the recording/monitoring sub-system, or alternatively may be recorded/monitored without summation. Summation relates to providing at least a portion, or optionally all, of the information for more than one session within a single forwarded session. For example, if the session's data includes audio data, then summation refers to audio summation.

The data to be forwarded may optionally be compressed before forwarding, but may alternatively be uncompressed. In the former case it may optionally be compressed by the recording/monitoring sub-system. In the latter case it may optionally be transmitted in an uncompressed form by the monitoring sub-system.

The data to be forwarded may also optionally be encapsulated before forwarding, for example according to TCP/IP protocols, but may alternatively not be encapsulated. In the latter case it may optionally be encapsulated by the recording/monitoring sub-system, or alternatively may be recorded/monitored without encapsulation.

According to another optional but preferred implementation of the present invention, the monitoring device is the NiceLog™ product of Nice Systems Ltd of Ra'anana, Israel.

Preferably, the port that the recording/monitoring device is connected to on the network switch or router needs not to be configured as a sniffing/mirroring port. Instead, the present invention is based upon the monitoring and/or recording of data on a session basis, where the responsibility for duplicating and forwarding the data to be recorded/monitored is not on the IP network infrastructure.

The present invention has a number of advantages. For example, the present invention lowers the network bandwidth utilization required for recording/monitoring. In addition, the present invention distributes the resources required for compressing the recorded data for saving storage resources. Another benefit is that the recorder does not need to have build-in compression capabilities thus reducing both its cost and complexity (for example less computing power, less hardware, fewer software algorithms and the like).

Hereinafter, the term "computational device" refers to any type of computer hardware system and/or to any type of software operating system, or cellular telephones or any type of hand-held device such as a PDA (personal data assistant), as well as to any type of device having a data processor and/or any type of microprocessor, or any type of device which is capable of performing any function of a computer.

Hereinafter, the term "session" refers to a plurality of transmissions between any two or more computational devices, which may optionally include more than one type of data, and which may also optionally (additionally or alternatively) include transmissions in the form of transmitted packets of data.

Hereinafter, the term "content of data" includes any information, including one or more characteristics that are descriptive of the actual data itself, that is included in the data packets of the session and that cannot be obtained from any other (external) source. It does not include any external characteristic of the data. Hereinafter, the term "external characteristic of the data" refers to metadata, or any type of data which is descriptive of the session and/or transmission or of the information within the session and/or transmission.

Hereinafter, the term IP telephone may optionally include a soft-phone.

For the present invention, a software application or program could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

Hereinafter, the term "duplication" and related terms may optionally include pre-processing, including (but not limited to) encryption, decryption, re-encapsulation or encapsulation, summation and compression.

BRIEF DESCRIPTION OF THE DRAWINGS

The invention is herein described, by way of example only, with reference to the accompanying drawings, wherein.

DESCRIPTION OF EMBODIMENTS OF THE INVENTION

The present invention is of a system and method for recording and/or otherwise monitoring IP media sessions. The present invention features a recording and/or monitoring device, referred to hereinafter as "a recording device" for the purposes of clarity only and without any intention of being limiting. When recording/monitoring is initiated, the recording device optionally and preferably becomes a participant in the IP media session, although alternatively and preferably the recording device only receives data for recording and/or otherwise monitoring the session. Therefore, the recorded/monitored IP media session optionally and preferably becomes a multi-user session, such as a "conference call" for example, even if data is being provided for recording from only one of the participants in the session. Alternatively, the data may optionally be monitored and/or recorded in a separate monitoring and/or recording session by the recording and/or monitoring device.

Optionally, only a portion of all such media sessions are recorded, although alternatively, all such sessions are recorded. The recording device may optionally receive a command for determining when a session is to be recorded. Alternatively, the recording device may receive data for all such sessions, but may preferably only record certain sessions. More preferably, a scheduler determines whether the session should be recorded, which may optionally be located with the recording device but alternatively is separated on the network.

According to a preferred embodiment of the present invention, the recording device is present on a network with a conference control unit, such as a MCU (multi conference unit) for example. Hereinafter, the term "conference" is used to refer to any multi-participant session, even if only two participants are present, one of which is the device of the present invention. The conference control unit either receives a request to initiate the conference call (media session) from the recording device of the present invention and/or from one of the participating IP communication devices, and/or from some other component on the network. Examples of such communication devices include, but are not limited to, IP telephony devices, IP telephones and computational devices which include an IP telephony component.

According to another preferred embodiment of the present invention, at least one, but optionally and more preferably all of the entities or parties which participate in the recorded/monitored session are able to duplicate the received and sent data, and then to forward the data to the recording/monitoring system. Optionally and preferably, the data is forwarded after only minimal address information is provided and/or changed, such that for example preferably only the destination IP address and port are changed, for example for data that is transmitted as IP packets. Thus, the data is preferably forwarded with minimum pre-processing. Optionally, this minimum pre-processing may include also the compression of some or all the data before forwarding. In a preferred embodiment of the present invention, such pre-processing is preferably performed by using compression resources of the communication system that were originally designed for being capable of compressing the data of the original sessions. Such pre-processing may also optionally include, but is not limited to, one or more of encapsulation, re-encapsulation, encryption, decryption or summation.

According to another preferred embodiment of the present invention, the duplication and forwarding of the recorded/monitored session data is performed by another component of the IP communication system, other than by a party to the session, for example by a gateway.

According to another optional but preferred implementation of the present invention, the recording device is the NiceLog™ product of Nice Systems Ltd of Ra'anana, Israel.

According to other optional but preferred embodiments of the present invention, the IP media session may also include one or more non-IP telephony devices, such as a telephone device communicating through the PSTN (public switched telephony network). For this embodiment, the system of the present invention preferably features a gateway for receiving such communication and for enabling the data to be passed to other components of the present invention, including but not limited to the recording device.

According to another optional but preferred implementation of the present invention, the system and method of the present invention are enabled for "hunt groups", which use a plurality of virtual telephone numbers rather than fixed telephone lines that are reserved for particular telephone numbers. Hunt groups are well known in the art; one example of a suitable reference is found in "Newton's Telecom Dictionary", 16th Expanded & Updated Edition, by Harry Newton (published in 2000, by Telecom Books; page 414), which is incorporated by reference as if fully set forth herein. Hereinafter, the term "hunt group" refers to any type of virtual or non-fixed telephone extension systems, in which a central control unit of some type, such as the gatekeeper of the present invention, determines the physical extension which is used.

According to another optional but preferred embodiment of the present invention, there is provided a system and method for forwarding data according to at least one characteristic of the data, such as metadata for example, without analyzing or otherwise filtering the data itself.

Optionally, only a portion of all such media sessions are recorded, although alternatively, all such sessions are recorded. The monitoring device may optionally receive a command for determining when a session is to be recorded. Alternatively, the monitoring device may receive data for all such sessions, but may preferably only record certain sessions. More preferably, a scheduler determines whether the session should be recorded, which may optionally be located with the monitoring device but alternatively is separated on the network.

The present invention may also optionally be implemented with a number of well known protocols in the background art for media and multimedia IP sessions, including but not limited to H.323, RTP (real time protocol), RTCP (real time control protocol), H.225 and H.245, Cisco Skinny protocol, Nortel uniStim protocol; as well as CODECs for encoding/decoding the media or multimedia data for such sessions, including but not limited to, G.711, G.723, G.722, G.728, G.729, H.261 and H.263 and all their flavors, versions, releases and/or types; all of which are hereby incorporated by reference as if fully set forth herein. In addition, references may be found at http://www.normos.org/ietf/rfc/rf-c1889.txt as of Aug. 17, 2001, which are also hereby incorporated by reference as if fully set forth herein, including all links and other data/Web pages found at the Web site. Further information may also be found in U.S. Pat. No. 6,122,665, issued Sep. 19, 2000, which is also incorporated by reference as if fully set forth herein.

The present invention is also operative with any type of data that is in a suitable format, such as audio, video and other types of data packets for example. The present invention is preferably operative with communication sessions of computer network-based telephone or telephone-like systems, including video conferencing, chat, Web Collaboration, trunk radio and other data sessions systems (enabling data sessions which are not necessarily audible or visible) that can optionally be logged and/or monitored, and/or optionally and preferably have their data selectively forwarded.

The principles and operation of the method according to the present invention may be better understood with reference to the drawings and the accompanying description. It should be noted that the present invention is described with regard to IP telephony for the purposes of clarity only and without any intention of being limiting.

Figure 1:
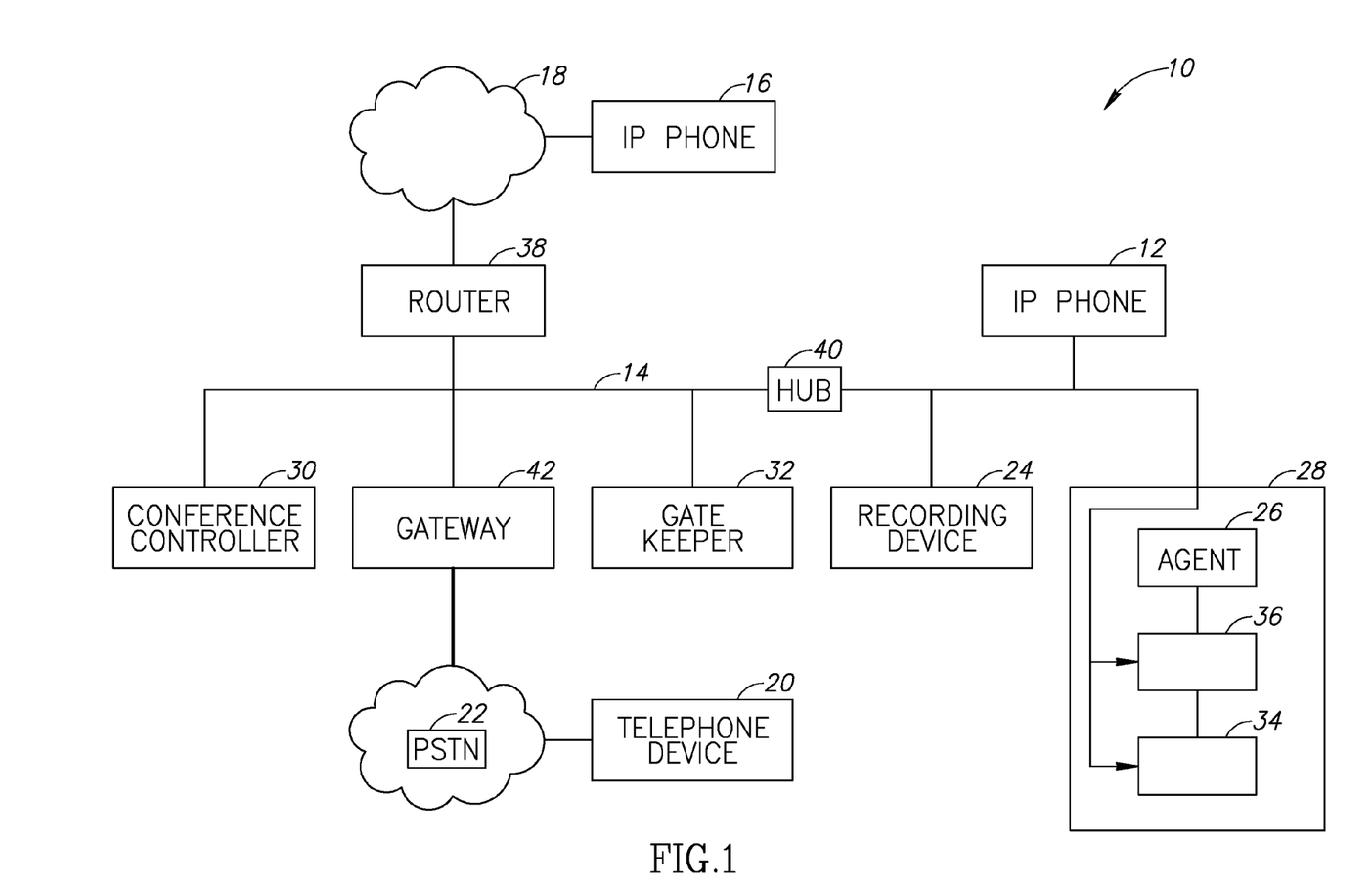
FIG. 1 is a schematic block diagram of an exemplary system according to the present invention.

Referring now to the drawings, FIG. 1 shows an illustrative system 10 for recording and/or otherwise monitoring an IP communication session, which may optionally be a media or multimedia session. The session may optionally be initiated at any one of an IP telephone 12 on a LAN (local area network) 14; an IP telephone 16 on a WAN (wide area network) 18; and a telephony device 20 communicating through a PSTN (public switched telephony network) 22. Examples of suitable IP telephones include but are not limited to, VIP 30 or SP+12 or 7900 series IP phones (Cisco Inc., San Jose, Calif., USA). Preferably, the actual handling of the session is slightly different for each of these different initiating devices, as described in greater detail below.

As shown, LAN 14 features a recording device 24. According to another optional but preferred implementation of the present invention, recording device 24 is the NiceLog™ product of Nice Systems Ltd of Ra'anana, Israel. This product features a monitor for monitoring activity through voice telephony on an IP network. Although the activity is monitored through voice telephony protocols, other types of data may also optionally be monitored, such as video and audio data transmissions. The monitor component of the NiceLog™ product includes a recording function to record these voice and other types of data transmissions. For example, the recording function may be manually activated to start recording. Further details may be found in the User's Manual of the NiceLog™ product.

Recording device 24 is preferably in communication with a recording agent 26 for controlling the process of recording, although optionally both recording device 24 and recording agent 26 may be present in a single device, although separate devices are preferred. Alternatively, recording device 24 may optionally perform all of these functions. Recording agent 26 is preferably operated as a software module by a computational device 28. According to the present invention, upon initiation of the IP media session, recording agent 26 determines that the session has been initiated and directs recording device 24 to record the session. Optionally, only certain sessions are recorded. In order to support recording, the media session is constructed as a conference call, and recording device 24 then becomes a participant in that conference call.

FIG. 1 shows one exemplary implementation for supporting these functions. As shown, LAN 14 also optionally and preferably is connected to a conference controller 30, such as an MCU for example. Conference controller 30 may optionally establish the conference call. Preferably, LAN 14 connects to a gatekeeper 32 according to the H.323 protocol, which translates telephone numbers to IP addresses, and therefore enables the initiating device to locate the other communication device (if present on LAN 14). A non-limiting example of gatekeeper 32 is the MCS 7820 product (Cisco Inc., San Jose, Calif., USA). Gatekeeper 32 may optionally be assisted in performing IP address resolution by a DHCP server (not shown), which is connected to LAN 14. The DHCP server assigns IP addresses to IP telephone 12 and to other IP telephones and devices; the assigned addresses are then passed to gatekeeper 32 for performing IP address resolution.

Figure 2:
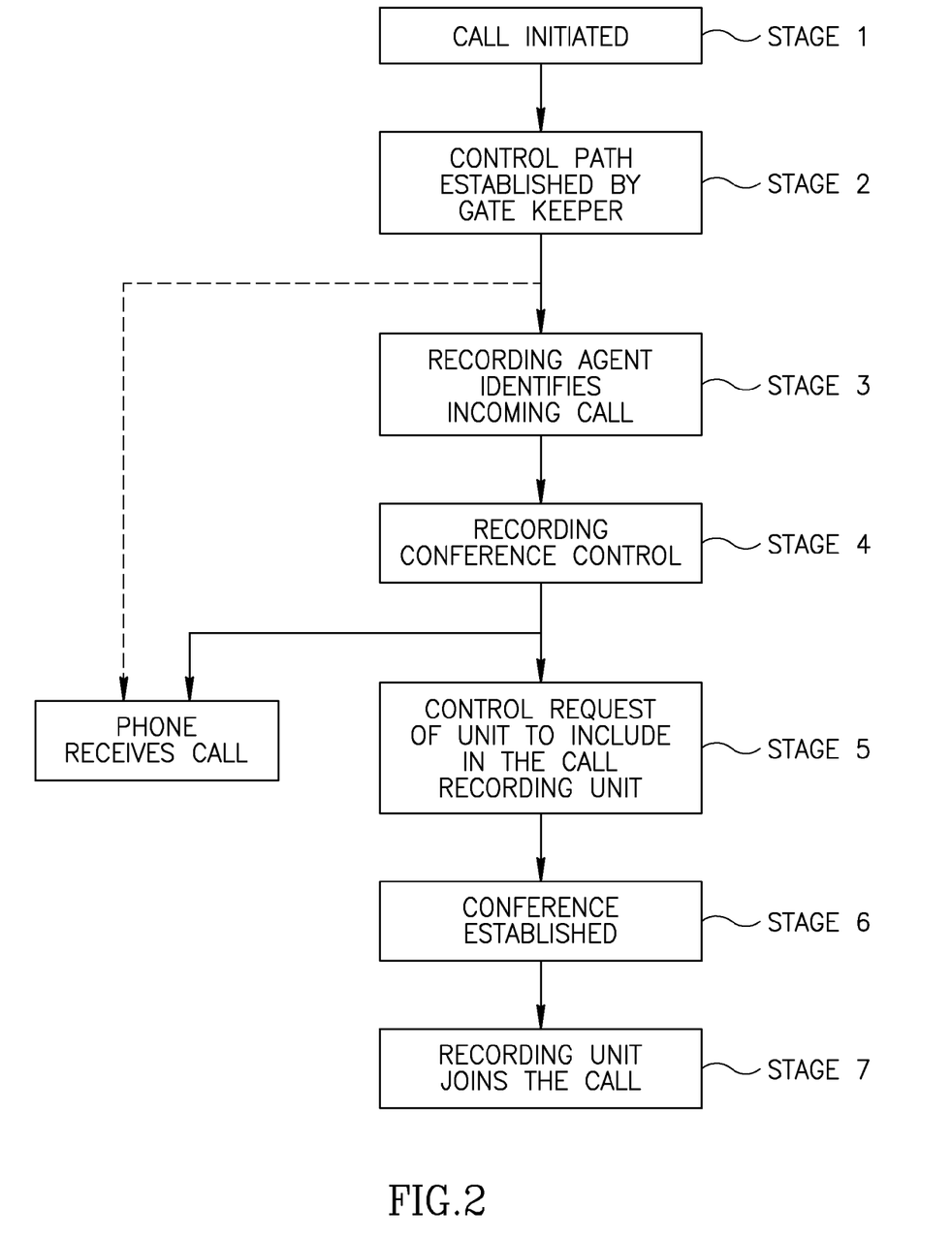
FIG. 2 is a flowchart of an exemplary method according to the present invention for recording and/or otherwise monitoring IP media sessions.

For the first example of initiating device previously given, IP telephone 12 on LAN 14 initiates the session, as explained also with regard to the flowchart of FIG. 2, showing an exemplary method according to the present invention for recording and/or otherwise monitoring IP media sessions. For example, IP telephone 12 may contact gatekeeper 32 to initiate the session with an IP telephone 34 on computational device 28 in stage 1. Both participants are therefore connected through LAN 14.

In stage 2, the control path is established by gatekeeper 32, for example according to the H.323 protocol, in order for the IP session to be initiated. In stage 3, if recording device 24 is not present and/or operational, preferably the normal IP communication session is enabled with IP telephone 34. Alternatively, if recording device 24 is present, then recording agent 26 preferably identifies the incoming request to initiate the session.

In stage 4, a recording agent control module 36, shown with regard to FIG. 1, preferably controls the conference call recording. Optionally and more preferably, recording agent control module 36 sends a request to initiate the conference call to gatekeeper 32. This request preferably includes a request to include recording device 24 in the conference call.

In stage 5, gatekeeper 32 sends a request to conference controller 30 to initiate the IP media session, with recording device 24 as a participant thereof. In stage 6, conference controller 30 initiates the conference call between IP telephone 12 and IP telephone 34. In stage 7, recording device 24 is preferably added to the conference call. Recording device 24 may optionally request, from conference controller 30 for example, that the data in the session is compressed before being sent to recording device 24. Conference controller 30 may optionally and preferably compress the data for being sent to recording device 24. Optionally and more preferably, if conference controller 30 is an MCU, then the MCU preferably performs compression of the data sent to recording device 24. Conference controller 30 (or the MCU if present) may also optionally perform pre-processing of the data, as previously described.

A similar operation is performed if the session is to be established with IP telephone 16 on WAN 18. As shown in FIG. 1, WAN 18 is optionally connected to LAN 14 through a router 38 (LAN 14 may optionally feature a hub 40). IP telephone 12 may again initiate the session by contacting gatekeeper 32; the remaining stages are performed substantially as previously described. Alternatively, IP telephone 16 may initiate the session. In order for IP telephone 16 to initiate the session and the recording, preferably IP telephone 16 features recording agent 26 and recording agent control module 36 as part of a single device. It should be noted that only one of IP telephone 12 and IP telephone 16 requires recording agent 26 and recording agent control module 36, operated directly by the IP telephone itself (in the case of a "smart telephone"), or alternatively operated by a computational device which also operates the IP telephone, in order for the session to be recorded.

The operation is preferably adjusted somewhat if a telephony device 20 communicating through a PSTN 22 is contacted by IP telephone 12 to initiate the media call and/or if telephony device 20 initiates the call. In both cases, communication to and from telephony device 20 passes through a gateway 42, for example in order to translate regular PSTN 22 communication to IP-based communication, such as H.323 protocol-based communication for example. Gateway 42 then preferably contacts gatekeeper 32 in order for telephony device 20 to be recognized as a participant in the session. The remaining functions are similar to those shown in FIG. 2. Gateway 42 may optionally be implemented as a Cisco Internet Router 3620, for example (Cisco Inc., San Jose, Calif., USA).

Figure 3:
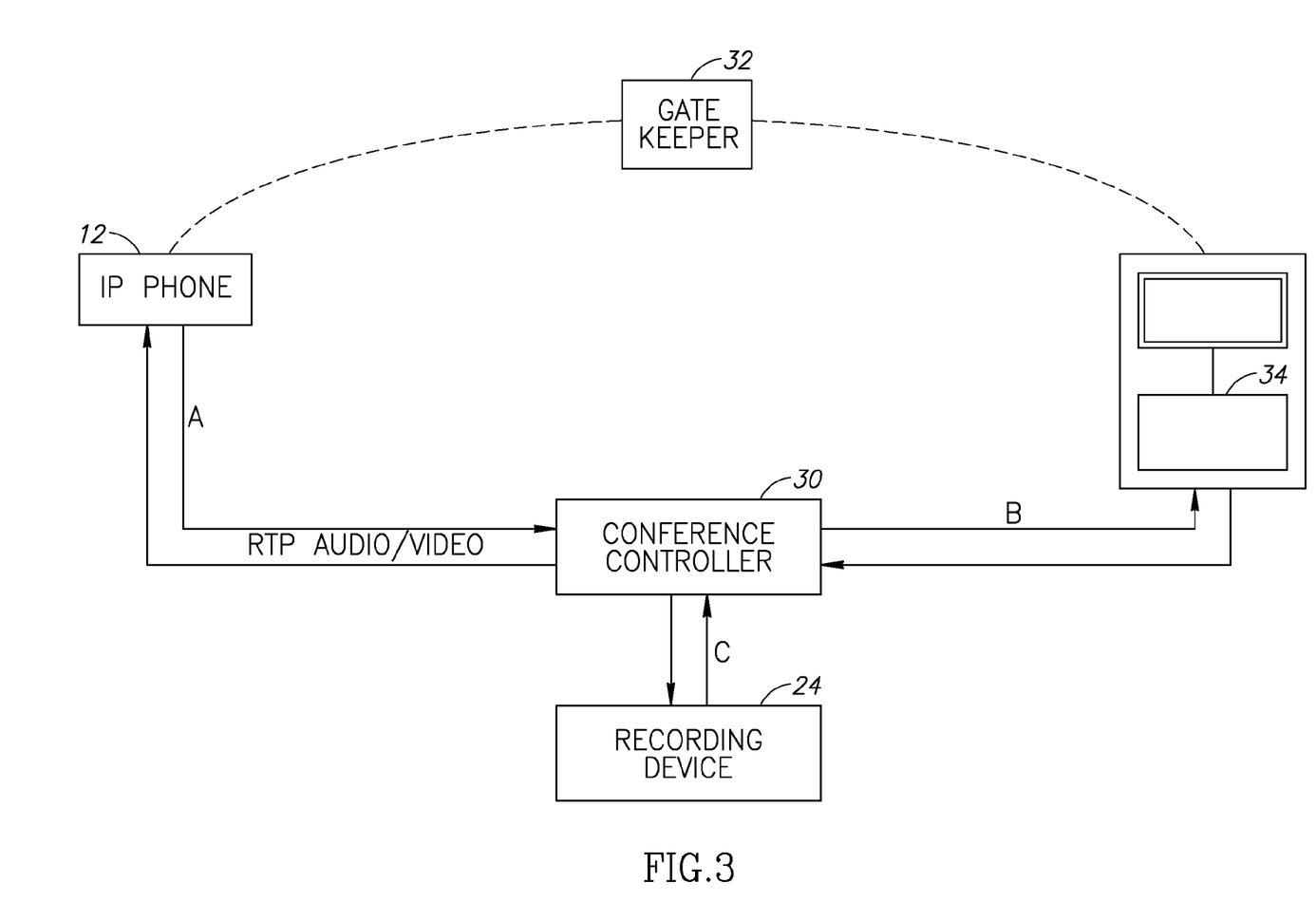
FIG. 3 is a flow diagram of an optional flow of operations according to the present invention.

FIG. 3 shows a flow diagram of an optional flow of operations according to the present invention. As shown, IP telephone 12 initiates the session, through gatekeeper 32, to IP telephone 34. The session is implemented as a conference call. Conference controller 30 enables recording device 24 to participate in the conference call, as well as preferably enabling the conference call itself. It should be noted that typically that only information passing through arrows "A" and "B", from each of IP telephone 12 and IP telephone 34 respectively, is recorded. Also, optionally and preferably, recording device 24 only receives communication through arrow "C".

For this implementation, recording device 24 preferably has at least one, and more preferably a plurality of, reserved telephone numbers which correspond to actual telephone lines. Video and/or audio data may optionally be captured according to the RTP (real time protocol) protocol.

Figure 4:
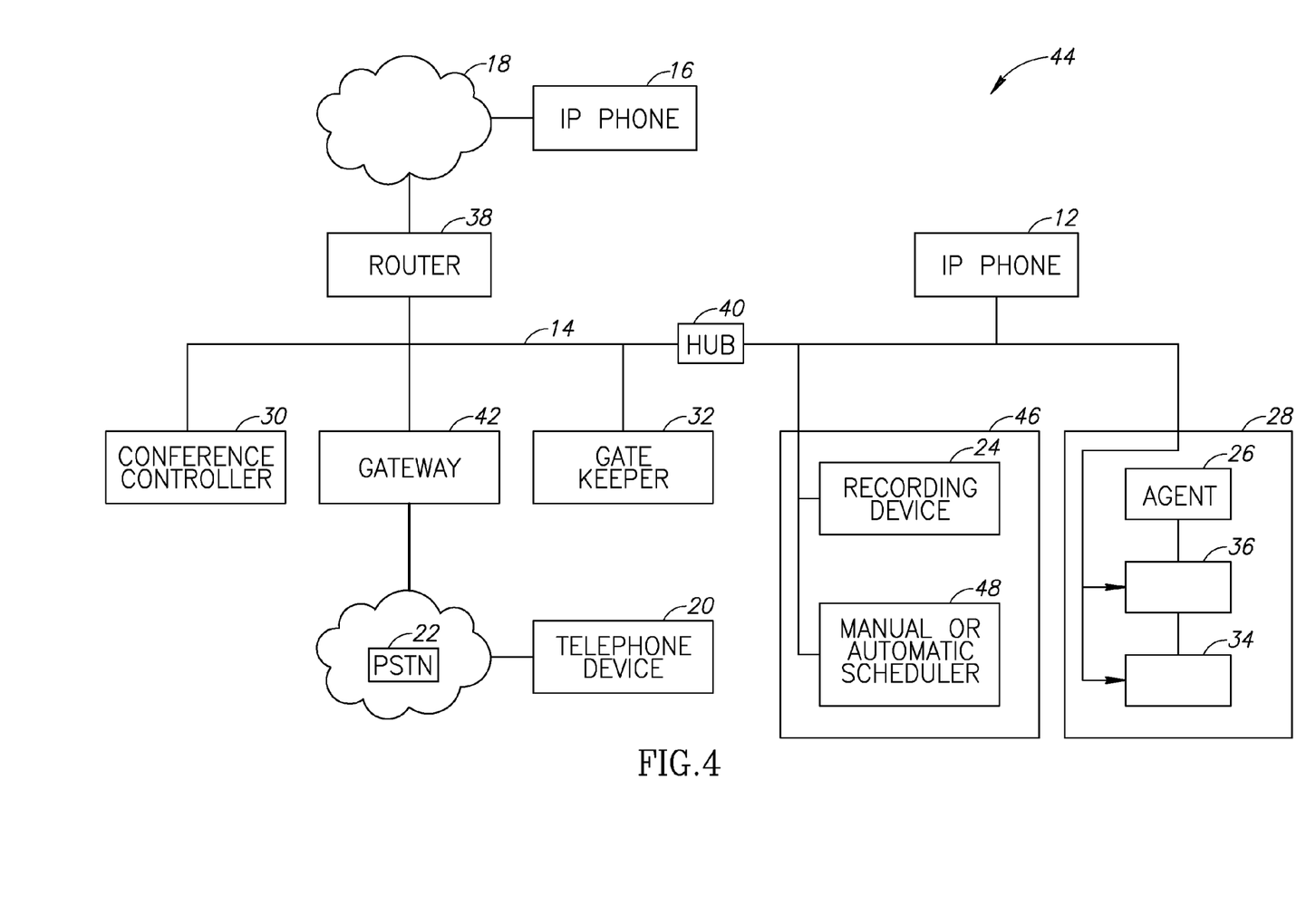
FIG. 4 is a schematic block diagram of a second exemplary system according to the present invention.

FIG. 4 shows another exemplary system 44 according to the present invention for selective recording of sessions. Similar components to FIG. 1 retain the same numbering. Now, recording device 24 is preferably contained within a selective recorder 46, which also features a scheduler 48. Scheduler 48 may optionally be manual or automatic. For the latter implementation, scheduler 48 may optionally analyze information about the IP media session, such as the identity of the initiating and/or receiving device, in order to determine whether the session should be recorded. For the manual implementation, the user at the receiving and/or initiating IP telephony device may optionally determine whether the session should be recorded.

Figure 5:
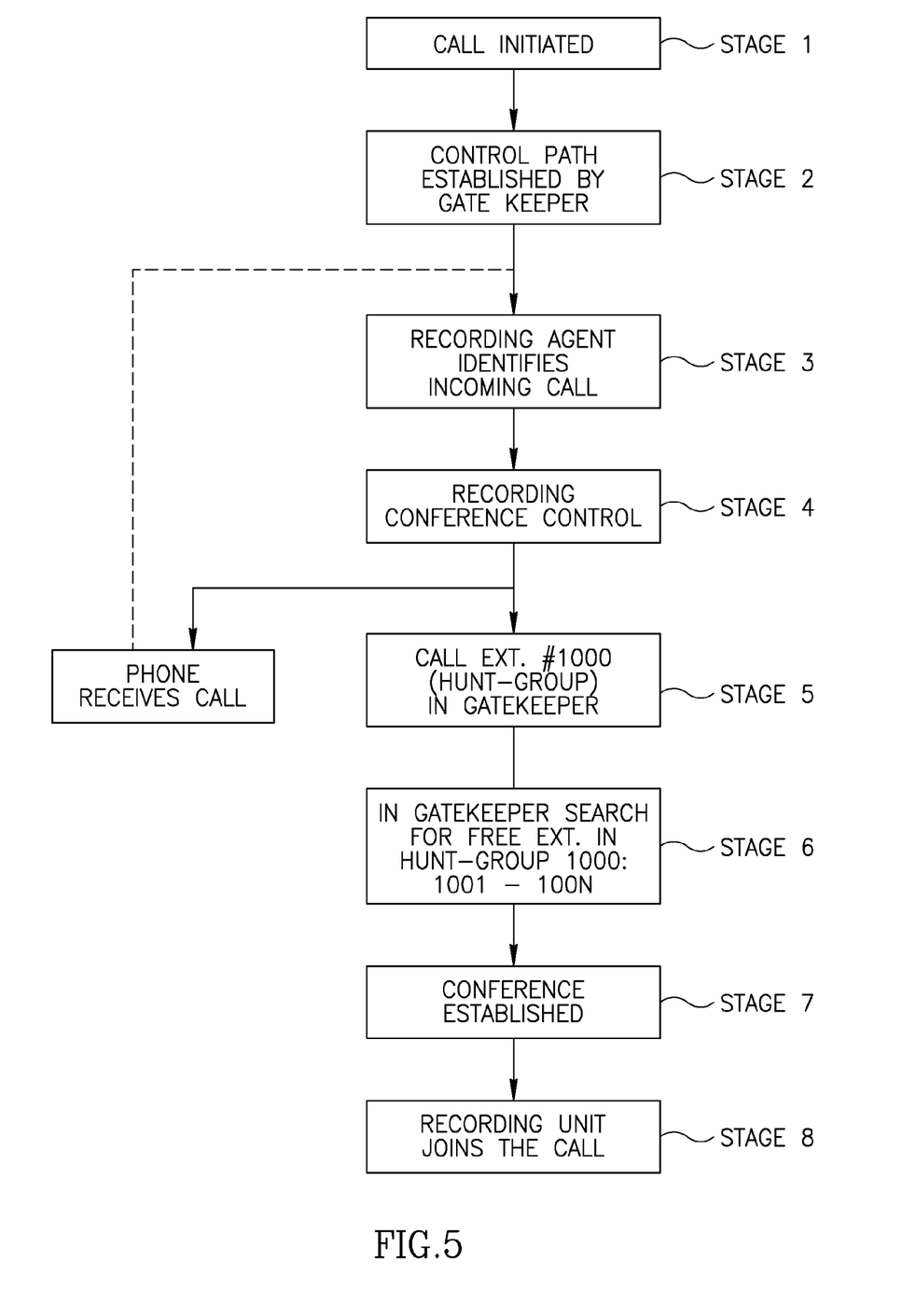
FIG. 5 shows a flowchart of another exemplary method according to the present invention, with regard to the implementation of the present invention with a "hunt group"

FIG. 5 shows a flowchart of another exemplary method according to the present invention, with regard to the implementation of the present invention with a "hunt group". As previously described, hunt groups use a plurality of virtual telephone numbers rather than fixed telephone lines that are reserved for particular telephone numbers. The present invention supports recording and/or otherwise monitoring IP media sessions with such hunt groups as shown in FIG. 5.

This preferred method is similar to that of FIG. 2 for stages 1-4. In stage 5, however, the gatekeeper identifies the hunt group which has been called.

In stage 6, the gatekeeper searches for a free telephone line within that particular hunt group. In stage 7, the conference call is established through the conference controller, and the recording device joins the conference call in stage 8, as previously described.

According to optional but preferred implementations of the present invention, any of the above embodiments may be optionally implemented with a computationally enabled telephone device in place of the computational device for operating the recording agent and/or the recording agent control module 36.

Figure 6:
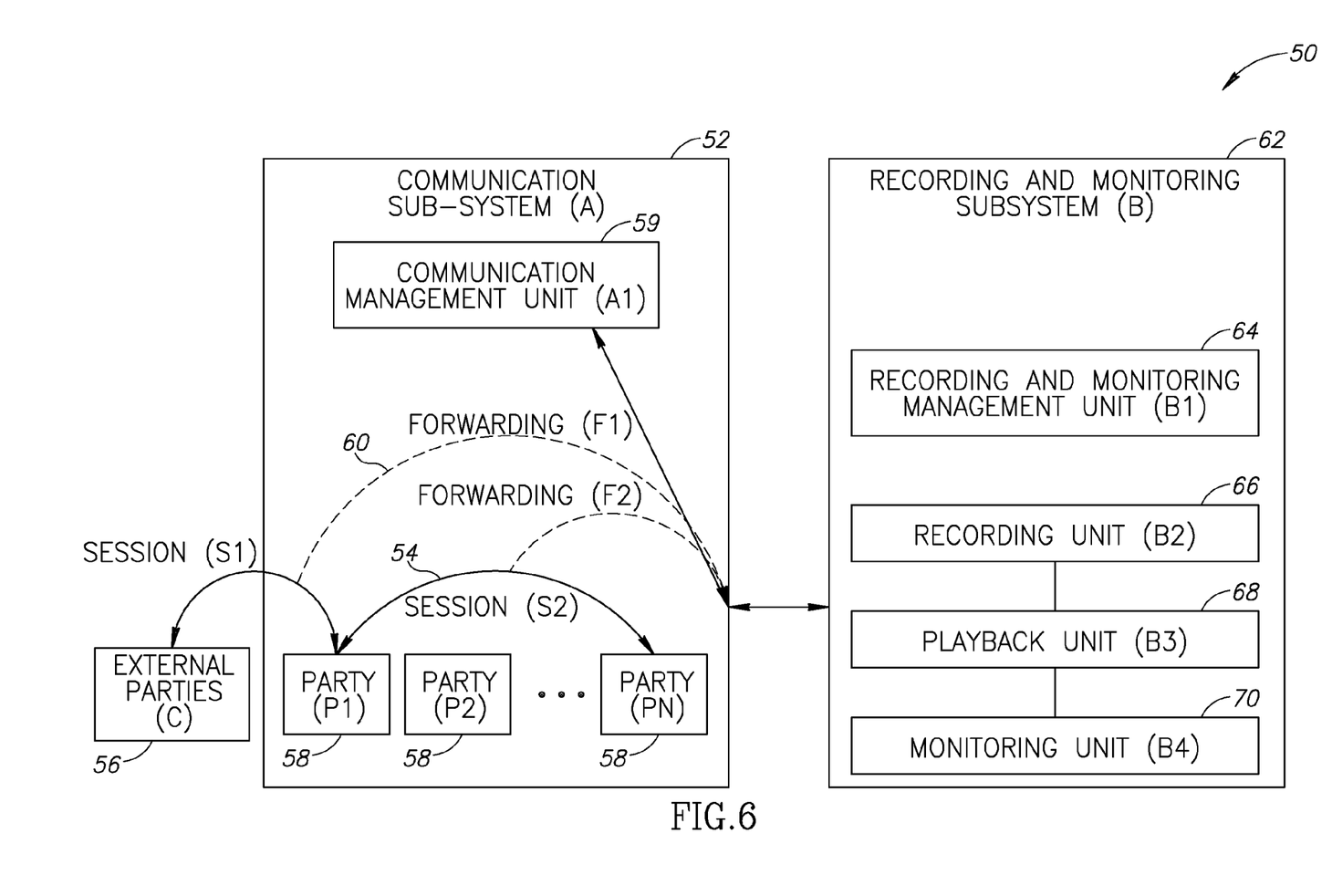
FIG. 6 is a schematic block diagram of an exemplary system according to the present invention.

FIG. 6 shows an illustrative system 50 according to the present invention for selectively forwarding data in a session, which may optionally be a communication session, and which is more preferably a media session. By "communication session" it is meant that at least a portion of the transmitted data is generated by a communication application and/or hardware device. Illustrative examples of such communication applications and/or hardware devices include but are not limited to, IP telephony software and/or hardware, IP telephones and computational devices which include an IP telephony component, computer network-based telephone or telephone-like systems, including but not limited to video conferencing, chat, Web Collaboration, trunk radio, application sharing and other data sessions systems (for example for enabling data sessions which are not necessarily audible or visible) that can optionally be logged and/or monitored, and/or optionally and preferably have their data selectively forwarded.

System 50 preferably features a communication sub-system 52 with a plurality of sessions 54 which are to be recorded and/or monitored. Illustrative sessions 54 shown in FIG. 6 are labeled as "s1" and "s2" to indicate a non-limiting, illustrative number of two sessions. Communication sub-system 52 may optionally feature one or more management units 59 sharing the functional responsibilities of managing communication sub-system 52, and several end-points, shown as a plurality of parties 58 (labeled as p1, p2 and pN for the purpose of illustration only and without any intention of being limiting). Management unit 59 may optionally and preferably include the functionality of an IP telephony Gatekeeper, for example a gatekeeper (software and/or hardware) operating according to the H.323 protocol. Management unit 59 may also optionally, additionally or alternatively, include the functionality of an IP telephony MCU, examples of which include but are not limited to, Cisco Call Manager, AVAYA Media Servers (and the MultiVantage software), and Nortel Succession Communication Server.

Communication sub-system 52 may optionally be connected to one or more external end points that are outside of communication sub-system 52, shown as at least one external party 56, again for the purposes of illustration and without any intention of being limiting. Such a connection may optionally and preferably be provided for managing sessions between them and the previously described internal end-points, which are shown as parties 58. The communication between the external end-point (external party 56) and communication sub-system 52 may optionally be transmitted by one or more signaling and/or media gateway(s) (not shown), for example for converting the signaling and/or media protocols and encoding.

According to another preferred embodiment of the present invention, at least one, but optionally and more preferably all of the entities or parties which participate in the recorded/monitored session, such as party 58 for example, are able to duplicate the received and sent data, and then to forward the data to the recording/monitoring system. Optionally and preferably, the data is forwarded after only minimal address information is provided and/or changed, such that for example preferably only the destination IP address and port are changed, for example for data that is transmitted as IP packets. Thus, the data is preferably forwarded with minimum pre-processing.

According to another preferred embodiment of the present invention, the duplication and forwarding of the recorded/monitored session data is performed by another component of the IP communication system, other than by a party to the session, for example by a gateway as previously described (not shown).

System 50 also optionally and preferably features a recording and monitoring sub system 62, which optionally and more preferably includes the following units: a recording and monitoring management unit 64, which supports the configuration of the system and preferably also manages its resources, a non-limiting example of which is NiceCLS™ (Nice Systems Ltd., Ra'anana, Israel) or any other call monitoring system that is known in the art; a recording unit 66, which receives the forwarded sessions data; a playback unit 68, which enables the reconstruction of a recorded session; and a monitoring unit 70, which enables monitoring of a forwarded session by a third party, no matter if it is recorded or not. It should be noted that system 50 may optionally and preferably feature one or more recording and monitoring sub systems 62, while each of recording and monitoring sub system 62 may optionally and preferably feature one or more of each of the above components.

The procedure of configuring the system and of initiating the duplication and forwarding process is not shown, although such a procedure is well known in the art and could easily be performed by one of ordinary skill in the art. Optionally, such a procedure may require one or more additional elements, which could also easily be selected by one of ordinary skill in the art.

One or more both of recording unit 66 and monitoring unit 70 may optionally be implemented as the NiceLog™ product of Nice Systems Ltd. of Ra'anana, Israel.

System 50 may optionally comprise more than one unit of any of the above types. Units may optionally and preferably be combined, where one unit may perform the functionality of another. For example, the management functionality may be implemented within recording unit 66, or within communication sub-system 52; non-limiting examples of configurations may optionally include one or more of incorporating the functions of monitoring and recording in the same unit, or incorporating recording and playback and monitoring in the same unit, or incorporating management and playback in the same unit. Each unit's functionality may optionally be split into several sub-units. By way of example only, and without any intention of being limiting, the function of recording may optionally be split into separate subunits for handling capturing and storage, respectively; management may optionally be split into separate subunits for handling engines and databases, and so forth. It is assumed that all of these configurations are within the area of the present invention.

The method of the present invention may optionally be used for recording/monitoring all of the sessions of communication sub-system 52, and/or for selecting the sessions to be recorded/monitored. Recorded/monitored sessions 54 may optionally include incoming and/or outgoing sessions 54 from external parties 56 (s1), and/or may also include internal sessions 54 (s2) between one or more parties 58 that are managed by communication sub system 52. A plurality of such parties 58 is shown as p1, p2 and pN, for the purpose of illustration only and without any intention of being limiting. The data from recorded/monitored sessions 54 is preferably forwarded to a recording and monitoring sub-system 62, as shown by a plurality of forwarding arrows 60 (f1, f2). A selection of one or more sessions 54 for which data is to be forwarded, and preferably recorded and/or monitored, may optionally be done at least partially, and more preferably is performed completely, according to a characteristic of one or more parties 58, for example in order to record all sessions 54 of a specific group of telephone extensions and/or users of an IP telephony system, or according to any other characteristic of party 58 or external party 56, for example in order to e.g. record all sessions 54 of a specific group of external parties 56. It should be noted that such a characteristic of one or more parties 58 is considered to be a characteristic of a session which includes such each party 58.

Optionally, the selection of one or more sessions 54 may optionally be made by assessing compliance with one or more rules (deterministic and/or statistical) by each session 54. A deterministic rule is optionally and preferably predefined according to one or more criteria. Non-limiting, illustrative examples of such rules include recording all sessions 54 per a given period of time, or per a number of sessions. The rule may optionally and preferably have multiple parts, for example by requiring that a specific extension be one party 58 to each such session 54, and/or by requiring that the other party 58 be included in a specific group of parties 58. An illustrative, non-limiting example of a statistical rule is recording 15% of the sessions of a specific telephone users group (group of parties 58 for example) between 7:00 and 11:00 AM every day.

Another example of a type of rule is an event driven rule, in which the rule (or request for action inherent to the rule) is invoked according to an event, which may occur for example at party 58. For example, the event could optionally be an operation at party 58, such as having the user "click on" or otherwise select a menu choice from a GUI (graphical user interface) being displayed by party 58. The event preferably occurs externally to session 54.

It should be noted that any of the above types of rules may optionally be static or dynamic. Configuring communication sub-system 52 to forward the necessary data to recording/monitoring sub-system 62 may optionally be performed in a number of different ways. Non-limiting examples, which may optionally be used singly or in combination, include direct configuration of communication sub-system 52, for example by using the menu of an IP telephone (which may optionally be an implementation of party 58), or by accessing management unit 59, which has a management utility or configuration application, that may optionally be operated as a client or as a console or otherwise. For example, within an IP telephone system, which is an optional implementation of system 50, and more specifically of communication sub-system 52, such configuration may optionally be performed by setting each IP telephone (party 58) to perform the forwarding, and/or by setting management unit 59 to handle forwarding of data. Data may optionally be duplicated and transmitted dynamically, for example by manual activation of duplication through an IP telephone (party 58).

Another optional mechanism for configuration of communication sub-system 52 is to pre-configure recording and monitoring sub-system 62, after which recording and monitoring sub-system 62 would request communication sub-system 52 to perform the forwarding. This is preferably performed by having recording and monitoring sub-system 62 use the API (application programming interface) of communication sub-system 52 either directly or indirectly. The indirect use may be implemented through a CTI (call telephony integration) Server for example. The CTI server preferably gives real time information on call events and also preferably supports bi-directional communication. Additionally or alternatively, recording and monitoring sub-system 62 may optionally request communication sub-system 52 to perform (and to stop) forwarding when both recording and monitoring sub-system 62 and communication sub-system 52 are operating "on-line". Such a request may optionally be performed per session or per party, optionally for a pre-determined period of time, and/or according to a fixed starting time and/or ending time. Such a request may optionally include a directive for performing algorithms over the data before forwarding it. Examples of such algorithms include but are not limited to, summation and compression.

Figure 7A:
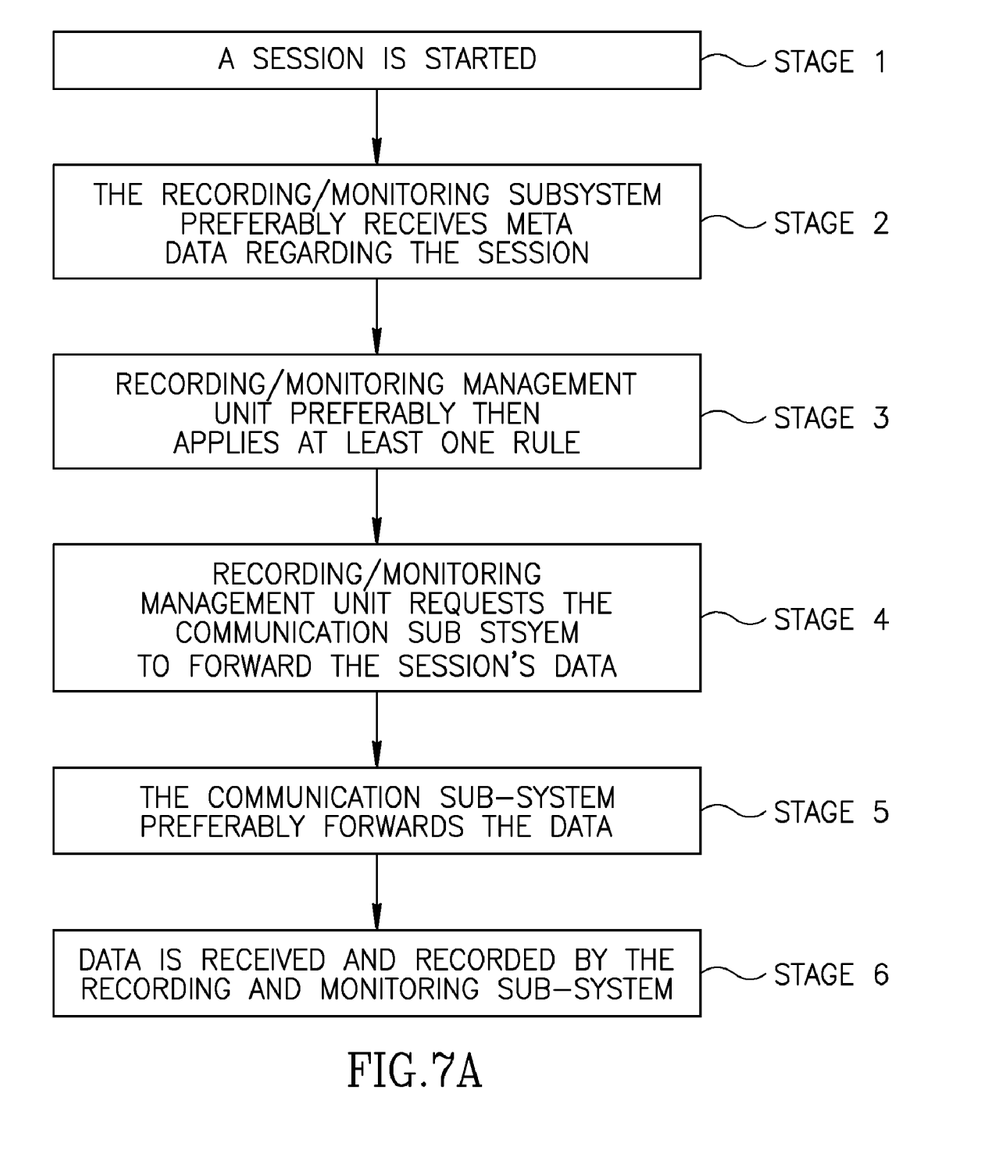
FIGS. 7A and 7B are flowcharts of exemplary methods according to the present invention for forwarding data for IP media sessions.
Figure 7B:
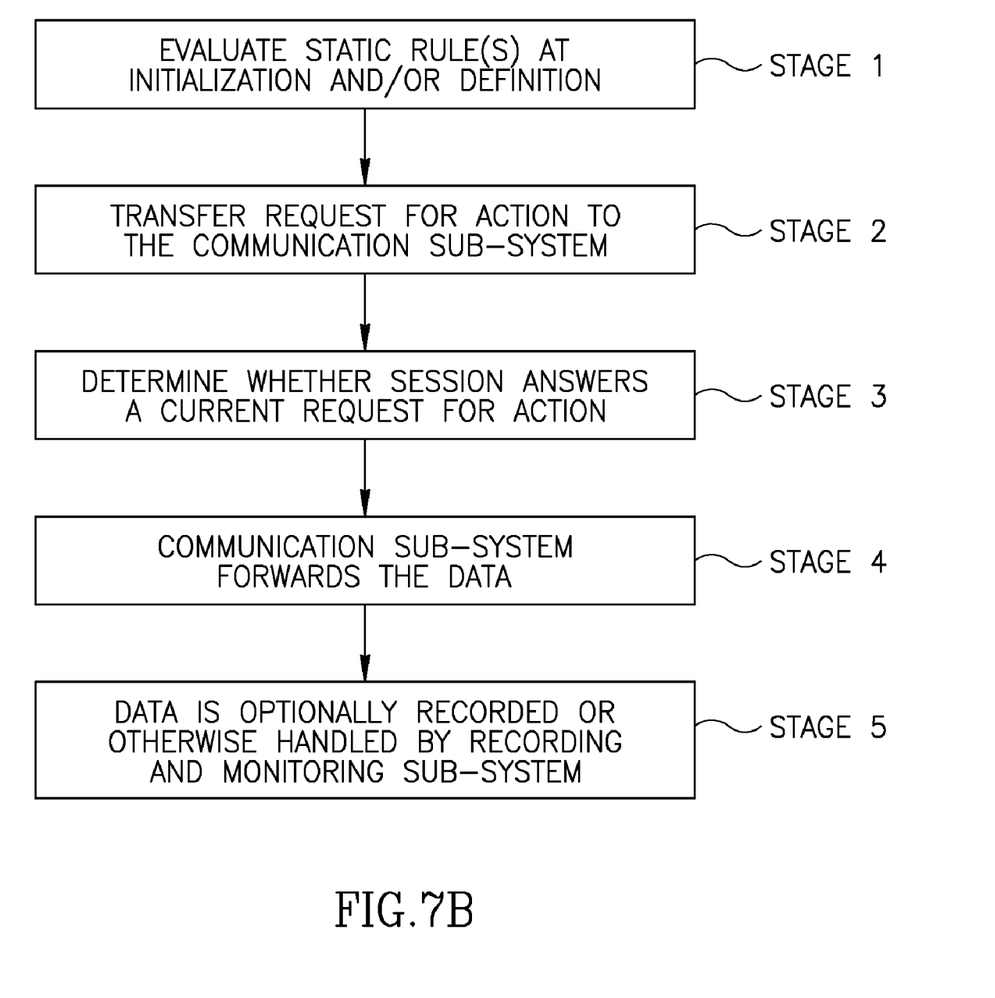

FIGS. 7A and 7B are flowcharts of exemplary methods according to the present invention for implementing one or more dynamic rules for forwarding data (FIG. 7A) and/or for implementing one or more static rules for forwarding data (FIG. 7B).

With regard to FIG. 7A, as shown, in the stage 1, a session is started. The session may optionally and preferably be performed between an external party and an internal party of the communication sub-system, or alternatively may be performed between two internal parties in the communication sub-system.

In stage 2, the recording/monitoring sub-system preferably receives meta data regarding the session, and/or another external characteristic of the data. It should be noted that the characteristics of the data, such as metadata for example, preferably do not require, or otherwise involve, analysis of the data itself. Such metadata preferably includes an external characteristic or aspect of the data or the session, such as identifiers derived from the session itself, referred to herein as "data/session" characteristics to include one or both of a data and/or a session characteristic or characteristics illustrative examples of such identifiers include, but are not limited to, an extension identifier, a telephone number, and/or another identifier. The data/session characteristics may optionally be received from the communication sub-system (either directly or via an external device, e.g. a CTI server as previously described), from an external (third) sub-system or database (e.g. a call center customers data base) or be derived from the data itself, and/or any combinations thereof.

In stage 3, the recording/monitoring management unit preferably then applies at least one rule. The rule may optionally be dynamic, such that it is triggered according to at least one characteristic of the session; or alternatively may be static. Optionally and more preferably, recording/monitoring management unit operates according to a plurality of rules, most preferably including at least one dynamic rule and at least one static rule.

Preferably, the rule is applied only to the external characteristic(s) of the data, and does not involve analysis and/or filtering of the actual content of the data. If the data is to be compressed before being forwarded, then the content of the data is preferably analyzed and/or filtered in order for compression to be performed, such that the data itself is preferably analyzed and/or filtered. Otherwise, the data is preferably forwarded without such analysis and/or filtering.

If the metadata and/or other external characteristic of the data matches and/or otherwise fits at least one rule, then the recording/monitoring management unit preferably requests the communication sub system to forward the session data (stage 4). The communication sub-system preferably then forwards data to the recording/monitoring sub-system.

Alternatively, the communication sub-system may optionally forward data, such as packets for example, preferably according to one or more rules as previously described. Such a rule may optionally require transmission of data for all sessions. More preferably, the rules operated by the recording/monitoring sub-system may optionally be more complex than those for the communication sub-system. Illustrative examples of these rules include, but are not limited to, the following: A) Record 10% of the sessions related to a specific campaign in a call center, as identified by the communication sub-system routing information reported to the recording/monitoring sub-system; B) Record all sessions from "gold" or preferred customers, who are optionally identified by the customer identifier inserted by the customer, for example when a Web-collaboration is started, and/or who are identified through a telephone number which may be identified automatically by the communication sub-system for example and reported to the recording/monitoring sub-system (which correlates these telephone numbers with the database of customer information.

In stage 5, the communication sub-system unit preferably duplicates the data and forwards it to the recording and monitoring sub-system. The duplication of the data may optionally consist of pre-processing, including but not limited to summation, compression and re-encapsulation or encapsulation of at least a portion of the data or alternatively of all of the data, according to a system preset or according to one or more rules. The rules may optionally be determined as described above, while the system preset is preferably determined for the communication sub-system unit, for example at the time of configuring the communication sub-system unit. In stage 6, the recording and monitoring sub system preferably records, and/or analyzes and/or displays and/or monitors the data.

FIG. 7B shows an illustrative implementation of a method according to the present invention for applying static rule(s). As shown, in stage 1, these rules are evaluated at the initialization of the recording/monitoring sub-system and/or upon the definition of each rule. In stage 2, the request for action included in the rule is preferably transferred to the communication sub-system. The request for action may optionally be to forward all the sessions or just the n next sessions of specific extensions/users for example, with the data either summed or unsummed, further compressed or forwarded without additional compression. In stage 3, for each session, the communication sub-system preferably determines whether the characteristic(s) of the session and/or of the metadata for the data of that session answers a current request for action. If it does, then in stage 4, the communication sub-system duplicates and forwards the data, after compressing it if required. In stage 5, the data is received, and optionally recorded and/or analyzed and/or displayed and/or monitored by the recording and monitoring sub-system.

While the invention has been described with respect to a limited number of embodiments, it will be appreciated that many variations, modifications and other applications of the invention may be made.

What is claimed is:

1. A method for recording Internet Protocol (IP) media sessions through a network, comprising:
providing a recording system located externally to an IP telephone system;
delivering to the recording system at least one characteristic of an IP media session from a call center customers database;
assessing said at least one characteristic for compliance with at least one rule applied by the recording system;
if said at least one characteristic matches said at least one rule, sending a request from the recording system to a management unit of an IP telephone to forward data related to the IP media session to the recording system; and
forwarding, by the IP telephone, data of the IP media session to the recording system, after adjusting destination IP address and port of the data.

2. The method of claim 1, wherein said at least one rule is related to preferred customers of the call center.

3. The method of claim 1, wherein said at least one rule is related to a specific campaign in the call center.

4. The method of claim 1, wherein said at least one rule comprises a deterministic rule.

5. The method of claim 1, wherein said at least one rule comprises a statistical rule.

6. The method of claim 5, wherein said statistical rule includes instructions to record a certain percentage of said session in a certain time interval.

7. The method of claim 1 wherein said at least one rule comprises an event driven rule.

8. The method of claim 1, wherein said at least one characteristic comprises metadata.

9. The method of claim 1 comprising:
pre-processing the data of the IP media session before forwarding.

10. The method of claim 9, wherein said pre-processing comprises performing at least one of encapsulation, re-encapsulation, summation, compression, encryption or decryption of at least a portion of the data.

11. The method of claim 1 comprising compressing the data prior to forwarding.

12. The method of claim 1 comprising:
detecting initiation of the IP media session by a recording agent; and
contacting the recording system by the recording agent.

13. The method of claim 1, further comprising at least one of:
displaying said forwarded data; and
recording said forwarded data.

14. The method of claim 1, wherein said at least one rule states that all data of the session is to be forwarded.

15. The method of claim 1, wherein said IP media session is one of the following sessions: voice over IP sessions, video conference sessions, chat sessions, a trunk radio sessions or web collaboration sessions.

16. The method of claim 1, wherein the forwarding comprises duplicating only a portion of the data.

17. The method of claim 1, wherein said at least one rule is driven by an event which occurs externally to the session.

18. The method of claim 1, wherein the forwarding is performed by one of the parties participating in the IP media session.

19. The method of claim 18, wherein one of the participating parties is an IP telephone.

20. The method of claim 18, wherein one of the participating parties is a gateway.

21. A method for recording Internet Protocol (IP) media sessions through a network, comprising:
providing a recording system located externally to a call center communication system;
delivering to the recording system at least one characteristic of an IP media session from a call center customers database;
assessing by the recording system the at least one characteristic for compliance with at least one rule and, if the at least one characteristic matches the at least one rule, sending a request, using call telephony integration (CTI), from the recording system to a management unit of the call center communication system to forward data related to the IP media session to the recording system; and
forwarding, by the call center communication system, data of the IP media session to the recording system, after adjusting destination IP address and port of the data.

22. A method for recording Internet Protocol (IP) media sessions through a network, comprising:
providing a recording system located externally to a communication system;
delivering to the recording system at least one characteristic related to a content exchanged in the IP media session;
assessing by the recording system the at least one characteristic for compliance with at least one rule, and, if the at least one characteristic matches the at least one rule, sending a request from the recording system to a management unit of the communication system to forward data related to the IP media session to the recording system; and
forwarding data of the IP media session to the recording system, after adjusting destination IP address and port of the data.

* * * * *